W. L. PFEFFERKORN, A. P. SCHLOERB & A. H. HAMMETTER.
BANQUET TOP FOR EXTENSION TABLES.
APPLICATION FILED MAY 19, 1913.
1,170,563.
Patented Feb. 8, 1916.
3 SHEETS—SHEET 1.
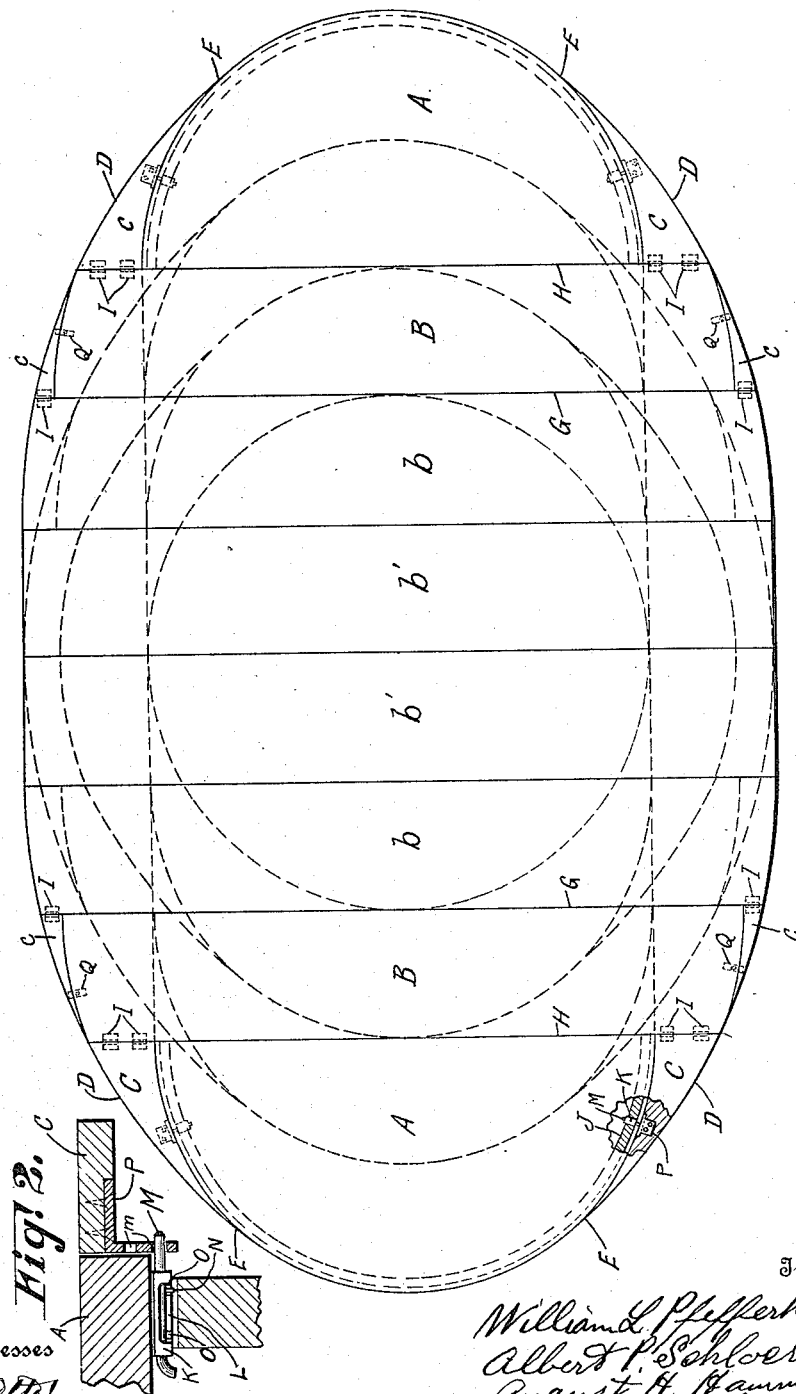
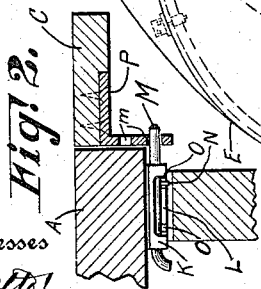

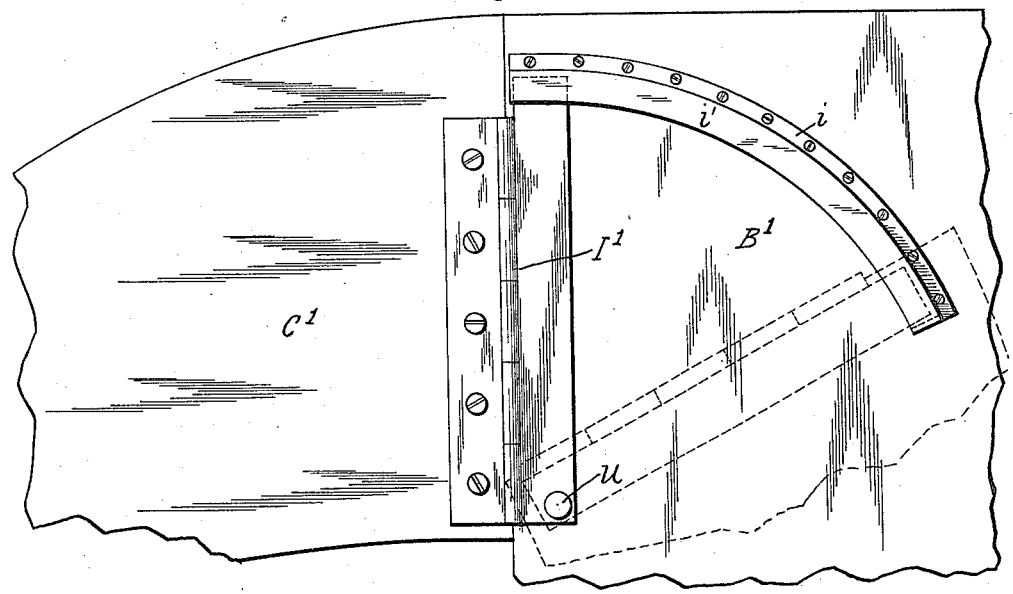

W. L. PFEFFERKORN, A. P. SCHLOERB & A. H. HAMMETTER.
BANQUET TOP FOR EXTENSION TABLES.
APPLICATION FILED MAY 19, 1913.
1,170,563.
Patented Feb. 8, 1916.
3 SHEETS—SHEET 3.
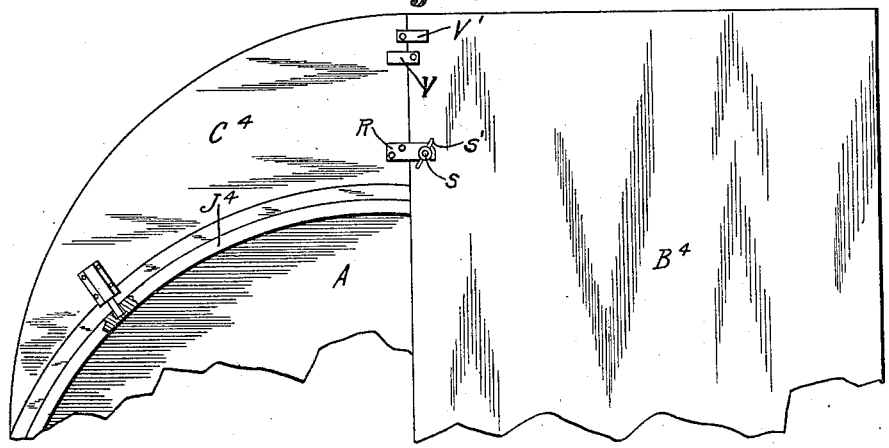
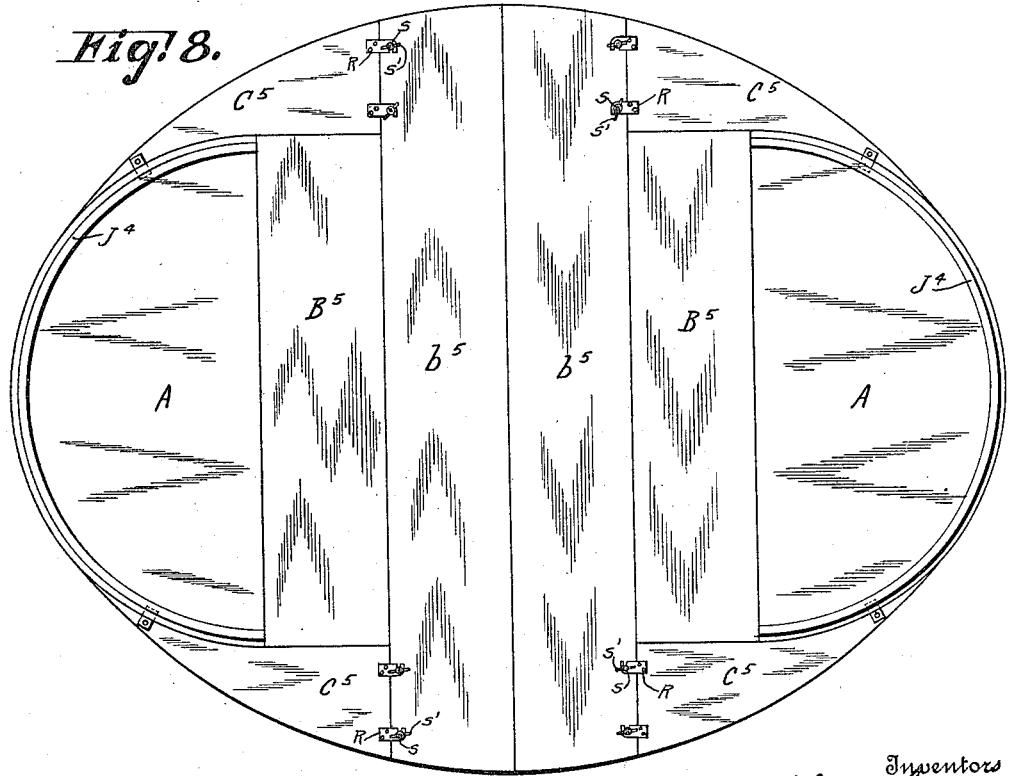

UNITED STATES PATENT OFFICE.

WILLIAM L. PFEFFERKORN, ALBERT P. SCHLOERB, AND AUGUST H. HAMMETTER, OF MILWAUKEE, WISCONSIN.

BANQUET-TOP FOR EXTENSION-TABLES.

1,170,563.

Specification of Letters Patent.

Patented Feb. 8, 1916.

Application filed May 19, 1913. Serial No. 768,400.

*To all whom it may concern:*

Be it known that we, WILLIAM L. PFEFFERKORN, ALBERT P. SCHLOERB, and AUGUST H. HAMMETTER, citizens of the United States, residing at Milwaukee, county of Milwaukee, and State of Wisconsin, have invented new and useful Improvements in Banquet-Tops for Extension-Tables, of which the following is a specification.

Our invention relates to improvements in banquet tops for extension tables.

The object of our invention is to provide means whereby the ordinary permanent top boards of an extension table may be utilized in connection with a set of banquet top filler boards to provide a table top of greater transverse dimensions than the ordinary top.

In the drawings: Figure 1 is a plan view of a table provided with a banquet top embodying our invention, the table being shown in extended position, with dotted lines indicating three different possible positions of adjustment. Fig. 2 is a fragmentary sectional view drawn on line x—x of Fig. 1, showing a supporting member for the lateral extension of the filler board. Fig. 3 is a detail view of a portion of one of the filler boards and its lateral extension as seen from the under side, showing a type of hinge adapted to permit the extension to be folded longitudinally of the filler board. Fig. 4 is a fragmentary view in plan, showing a modified connection between the filler board and its lateral extension. Fig. 5 is a fragmentary sectional view through one of the hinge members, showing the type of hinge preferably employed in the arrangement shown in Fig. 4. Fig. 6 is a sectional view, showing another modification of the connecting means between the filler board and lateral extension. Fig. 7 is a detail view of fragments of a filler board and top board, showing a further modification of the lateral extension. Fig. 8 is a bottom plan view showing a set of banquet filler boards employed in connection with filler boards of ordinary type, the banquet filler boards having lateral extensions of greater length than in the other views, whereby they extend along the ends of the shorter filler boards and also along the margins of the permanent top boards.

Like parts are identified by the same reference characters throughout all the views.

Referring to Fig. 1, the permanent top boards A are of ordinary type. The filler boards B are of greater length than the width of the top boards A, and a lateral extension C is adjustably secured to the projecting portion of each filler board B along its outer side margins. These extensions C are adapted, when in position for use, to fill the angles formed by the projecting ends of the filler boards B with the side margins of the members A, or other parts of a table top having less width. The margin D of each of these extensions C converges from the filler board toward the member A, preferably along a curved line, whereby each member C is given a tapering form, terminating in a point E. In the construction shown, the members A have rounded or semi-circular margins, and the extended table with the banquet top in place, is designed to be oval in form. The margin D of each filler board extension C is therefore curved to form a substantial continuation of the curved margin of the member A, but along a different arc of curvature. The end margins of the filler board B are also curved to provide a continuation of the curved margin D. The inner margin G of the filler board, therefore, has a greater length than the outer margin H to which the lateral extensions C are applied.

The extensions C may be secured to the filler boards B and also supported from fixed parts of the table top by any suitable means. In Fig. 1, ordinary hinges I are illustrated, said hinges being applied to the under side of the members B and C, and secured thereto in the ordinary manner, whereby the member C may swing downwardly and fold underneath the member B. When in use, however, the extensions C will preferably have a supporting connection with both the filler board and one of the fixed portions of the table top. The specific type of supporting means illustrated is not essential to our invention, but in the arrangement shown in Fig. 1, it will be convenient to provide the bed rail J with a sleeve K, the latter being inserted through a hole in the bed rail directly underneath the top board A, as shown in Fig. 2. This sleeve is provided with a slot L, and a supporting bolt M is mounted to slide in the sleeve and provided with a projecting pin N, which passes through the slot. The slot is provided with a notch O into which the pin may drop, whereby the bolt may be locked in an outwardly projecting position. The member C is provided with a bracket P, having holes $m$ at two different levels, each adapted to receive the bolt M. These holes are preferably elongated in a horizontal plane to facilitate entry of the bolt, and the end of the bolt will preferably be slightly tapered to also facilitate entry into the holes. When the filler extension C and top board A are of the same thickness, the bolt M will enter in the upper hole $m$, but when the permanent top board A is of double thickness, the bolt M will enter the lower hole $m$ of bracket P. By rotating the bolt slightly when the pin N is in registry with the notch O, the bolt will be locked against accidental displacement, and the tapering end of the member C will be securely supported with said member in a horizontal position. A second set or pair of filler boards $b$ are employed which have extensions $c$ of the same type as the extensions C of the filler boards B. These extensions lap over the ends of the filler boards B, and are supported therefrom by any suitable means, but preferably by ordinary turn buttons Q. The outer margins of these extensions $c$ are curved and with the end margins of the fillers $b$, constitute substantially a continuation of the curvature of the margins D of extensions C. Other filler boards of similar character may be added, if desired, but we preferably employ filler boards $b^1$ of the same length as the inner margins of the filler boards $b$, unless it is desired to further extend the width of the table in proportion to the extension in length.

It will be understood that when the table contains only the filler boards B, its shape will be substantially that indicated by the intermediate dotted line. When the filler boards $b$ are added, the shape of the table is indicated by the outer dotted line. When no filler boards are used, the permanent top boards will meet and the form of the table, when thus adjusted, is indicated by the inner dotted line. The contour in each of the several adjustments, however, is not essential to our invention but may be altered to suit the taste of the purchaser.

In Fig. 3, the filler board $B^1$ and extension $C^1$ may be regarded as the same in form as the members B and C in Fig. 1, the hinge $I^1$ having one of its leaves pivoted at U to the board $B^1$ and its other end extended and engaged under a flange $i^1$, carried by a segmental member $i$, which is secured to the filler. This construction allows the extension member $C^1$ to not only swing downwardly and fold underneath the filler board $B^1$, but also allows it to swing, when so folded, to a position where it will extend longitudinally along the filler board to the position indicated by dotted lines in Fig. 3. The object of this construction is to provide means whereby the extension $C^1$, (which is longer than the filler board is wide), may be so folded that it will not project across the margin of the filler board to a position where the pointed end might be struck and broken. In Fig. 4, the same result of permitting the extension to fold upon the filler board without projecting across it, is accomplished by so cutting these members that their abutting margins will meet an a diagonal line. In this construction, double jointed hinges $I^2$ will preferably be employed for the reason that the extension $C^2$ would swing inwardly if folded downwardly and would strike the fixed parts of the table, and it is therefore desirable in this construction that the extension $C^2$ be folded upwardly to a superposed position on the filler board $B^2$. A double jointed hinge permits this to be done without having the hinge members extend above the surface of the boards when the members are in position for use.

In Fig. 6, we have illustrated fragments of a filler board $B^3$ and an extension member $C^3$, which are detachably connected together by a separable hinge $I^3$. One member of this hinge comprises a plate secured to the extension $C^3$, and having a hooked extremity which loosely engages a staple shaped pintle member. In this construction the extension $C^3$ may be swung downwardly and then wholly disengaged from the filler board and separately stored.

In Fig. 7, a filler board $B^4$ is illustrated as having a depending bolt S to which a thumb nut $S^1$ is applied. The extension member $C^4$ is provided with a metallic clip R which projects across the abutting margins of the extension and the member $B^4$, and is provided with an open slot adapted to receive the bolt S. The slot extends to the inner side margin of the member R, whereby the extension member $C^4$ may be adjusted in position by moving it inwardly along the margin of the member $B^4$ until it strikes the table top member A. A metal clip or plate V is also preferably secured to the under surface of the filler board and projects underneath the extension $C^4$. The extension $C^4$ is provided with a similar clip $V^1$, which projects underneath the filler board. These two clips support the abutting margins of the filler board and extension against relative vertical movements. With this construction a fixed pin T may be employed to support the tapered end of the member C⁴, said pin being preferably rigidly attached to the member C⁴ and adapted to socket in the bed rail J⁴, or in the table top member A. When it is desired to release or readjust the member C⁴, it is merely necessary to loosen the thumb screw S¹, whereupon the member C⁴ may be drawn outwardly and detached. It may then be separately stored or it may be adjusted in the position on the under side of the member B⁴, with the clip R engaging bolt S and held in position by tightening the thumb screw.

In Fig. 8, the same connecting means are employed as shown in Fig. 1, but with two thumb screws and nuts, and the clips V and V¹ omitted. But in Fig. 8, the filler boards B⁵ are of ordinary type so that when the table is extended by inserting two filler boards only, it will not be increased in width.

The filler boards b⁵ are provided with extension members C⁵ of such size that they will extend across the ends of the filler boards B⁵ respectively and lap along the side margins of the permanent top boards A. In this construction, that part of the extension C⁵ which laps upon the member A, will conform in shape, size and function to the member C⁴ shown in Fig. 7. But that part of the member C⁵ which extends across the end of the filler board B⁵, constitutes an added feature of the extension which enables us to utilize a set of short filler boards in the described manner.

The several modifications illustrated in the drawings relate largely to the supporting connections, and these connections are illustrated in each of the views as supporting the extension members C from both the filler board and the fixed top member. It is not material to our invention whether the specific connections illustrated are employed or not, as it is obvious that any other suitable connections might be employed. It is also not essential to our invention whether this extension member is wholly supported from the fixed portion of the table top or wholly supported from the filler board, or whether, as illustrated in the drawings, it is supported from both of these members. It will also be understood that in describing the extension members as adjustably connected with the table top or filler board, we refer not only to the forms of construction in which the extension member is hinged to the filler board, but also to forms of construction in which the connections are detachable or in which the extension member is wholly removed when not in use.

In Fig. 8, an elbowed plate W, connected with the member C⁵, laps over the upper surface of member A and supports member C⁵ therefrom. This may be used as a substitute for the fixed pin T of Fig. 7, or for the buttons or bolts shown in the other views.

We claim—

1. The combination with a lineally extensible table frame having permanent top boards at its respective ends, of a set of filler boards adapted to fill the space between the top boards when the table is extended, some of said filler boards being longer than the others whereby said table at a given degree of lineal extension may have a standard width when the short boards only are used, substantially equal to that of the permanent top boards and an abnormal width in its central portion when the longer filler boards are used, and a set of table top members adapted to fill the angles formed by the projecting ends of the longer filler boards with the other portions of the table top, said angle filling members having their outer margins contoured to form symmetrical extensions of the remaining exposed margins of the filler boards and top members, substantially as described.

2. The combination with a lineally extensible table frame having permanent top boards at its respective ends, of a set of filler boards adapted to fill the space between the top boards when the table is extended, some of said filler boards being longer than the others whereby said table at a given degree of lineal extension may have a standard width when the short boards only are used, substantially equal to that of the permanent top boards and an abnormal width in its central portion when the longer filler boards are used, and a set of table top members adapted to fill the angles formed by the projecting ends of the longer filler boards with the other portions of the table top, said angle filling members having their outer margins contoured to form symmetrical extensions of the remaining exposed margins of the filler boards and top members, each of said angle filling members being connected with one of the longer filler boards and adapted to fold upon the under side of the same when such filler boards are not in use, substantially as described.

3. The combination with a lineally extensible table frame having permanent top boards at its respective ends, of a set of filler boards adapted to fill the space between the top boards when the table is extended, some of said filler boards being longer than the others whereby said table at a given degree of lineal extension may have a standard width when the short boards only are used, substantially equal to that of the permanent top boards and an abnormal width in its central portion when the longer filler boards are used, and a set of table top members adapted to fill the angles formed by the projecting ends of the longer filler boards with the other portions of the table top, said angle filling members having their outer margins contoured to form symmetrical extensions of the remaining exposed margins of the filler boards and top members, each of said angle filling members being provided with supporting connections engaging the longer filler boards and the margins of the shorter filler boards or table top members against which they abut when in angle filling position.

In testimony whereof we affix our signatures in the presence of two witnesses.

WILLIAM L. PFEFFERKORN.
ALBERT P. SCHLOERB.
AUGUST H. HAMMETTER.

Witnesses:
AL. H. HAMMETTER,
CLARENCE J. RICE.

Copies of this patent may be obtained for five cents each, by addressing the "Commissioner of Patents. Washington, D. C."